(12) United States Patent
Shatskih et al.

(10) Patent No.: US 9,152,823 B2
(45) Date of Patent: Oct. 6, 2015

(54) SYSTEMS, METHODS, AND COMPUTER READABLE MEDIA FOR COMPUTER DATA PROTECTION

(75) Inventors: Maxim S. Shatskih, Moscow (RU); James Kirby, Palomar Mountain, CA (US); Scott Barnes, Springville, UT (US)

(73) Assignee: Storagecraft Technology Corporation, Draper, UT (US)

( * ) Notice: Subject to any disclaimer, the term of this patent is extended or adjusted under 35 U.S.C. 154(b) by 504 days.

(21) Appl. No.: 11/112,758

(22) Filed: Apr. 22, 2005

(65) Prior Publication Data

US 2006/0242381 A1    Oct. 26, 2006

(51) Int. Cl.
| | |
|---|---|
| G06F 12/00 | (2006.01) |
| G06F 13/00 | (2006.01) |
| G06F 13/28 | (2006.01) |
| G06F 21/78 | (2013.01) |
| G06F 3/06 | (2006.01) |

(52) U.S. Cl.
CPC .............. *G06F 21/78* (2013.01); *G06F 3/0601* (2013.01); *G06F 2003/0697* (2013.01)

(58) Field of Classification Search
CPC  G06F 21/78; G06F 2003/0697; G06F 3/0601
USPC ................................................. 711/113, 163
See application file for complete search history.

(56) References Cited

U.S. PATENT DOCUMENTS

| | | | | |
|---|---|---|---|---|
| 4,499,539 A | * | 2/1985 | Vosacek ................................ | 1/1 |
| 5,247,639 A | * | 9/1993 | Yamahata ..................... | 711/138 |
| 5,301,287 A | * | 4/1994 | Herrell et al. ................. | 711/202 |
| 5,390,186 A | * | 2/1995 | Murata et al. ................. | 711/113 |
| 5,721,916 A | * | 2/1998 | Pardikar ................................ | 1/1 |
| 5,987,530 A | * | 11/1999 | Thomson .......................... | 710/4 |
| 6,076,148 A | | 6/2000 | Kedem | |
| 6,226,759 B1 | | 5/2001 | Miller et al. | |
| 6,256,710 B1 | * | 7/2001 | Yazdy et al. .................. | 711/133 |
| 6,289,426 B1 | | 9/2001 | Maffezzoni et al. | |
| 6,356,915 B1 | | 3/2002 | Chtchetkine et al. | |

(Continued)

OTHER PUBLICATIONS

Mark Friedman et al., Windows 2000 Performance Guide, Jan. 2002, O'Reilly, pages renumbered 1-32.*

(Continued)

*Primary Examiner* — Charles Rones
*Assistant Examiner* — Sidney Li
(74) *Attorney, Agent, or Firm* — Maschoff Brennan

(57) ABSTRACT

The present invention comprises computing systems, computer readable media, and methods of protecting computing systems. Embodiments comprise defining a virtual volume, mounting the virtual volume, and processing write accesses. Processing write accesses comprises creating a virtual volume record in a virtual volume database associated with the write access and storing write data at a free location of a shadow cache. Embodiments may also include processing read accesses comprising comparing the read accesses to a virtual volume record to determine if a matching virtual volume record exists, reading data from the target volume if the matching virtual volume record is absent, and reading a data from the shadow cache if the matching virtual volume record is present. Embodiments may also comprise processing at least one virtual volume record upon the occurrence of an event of interest and includes copying a cache data segment from the shadow cache to the target volume.

11 Claims, 6 Drawing Sheets

(56) References Cited

U.S. PATENT DOCUMENTS

| | | | |
|---|---|---|---|
| 6,463,509 B1* | 10/2002 | Teoman et al. | 711/137 |
| 6,594,780 B1 | 7/2003 | Shen et al. | |
| 6,651,143 B2* | 11/2003 | Mounes-Toussi | 711/138 |
| 6,757,705 B1* | 6/2004 | Pardikar et al. | 709/203 |
| 6,850,980 B1* | 2/2005 | Gourlay | 709/226 |
| 7,308,543 B2* | 12/2007 | Kishi | 711/154 |
| 2001/0037433 A1* | 11/2001 | Dempsey et al. | 711/141 |
| 2003/0033386 A1* | 2/2003 | Dahlen et al. | 709/220 |
| 2003/0061450 A1* | 3/2003 | Mosur et al. | 711/135 |
| 2003/0229753 A1* | 12/2003 | Hwang | 711/103 |
| 2004/0236777 A1* | 11/2004 | Pardikar et al. | 707/100 |
| 2005/0278486 A1* | 12/2005 | Trika et al. | 711/142 |

OTHER PUBLICATIONS

Handy, Jim. "The Cache Memory Book." 1998. Academic Press, Inc. Second Edition. pp. 8-12.*

Jim Mauro and Richard McDougall, "Solaris Internals: Core Kernel Components", 2000, Prentice Hall, pp. 1-4 (renumbered).*

* cited by examiner

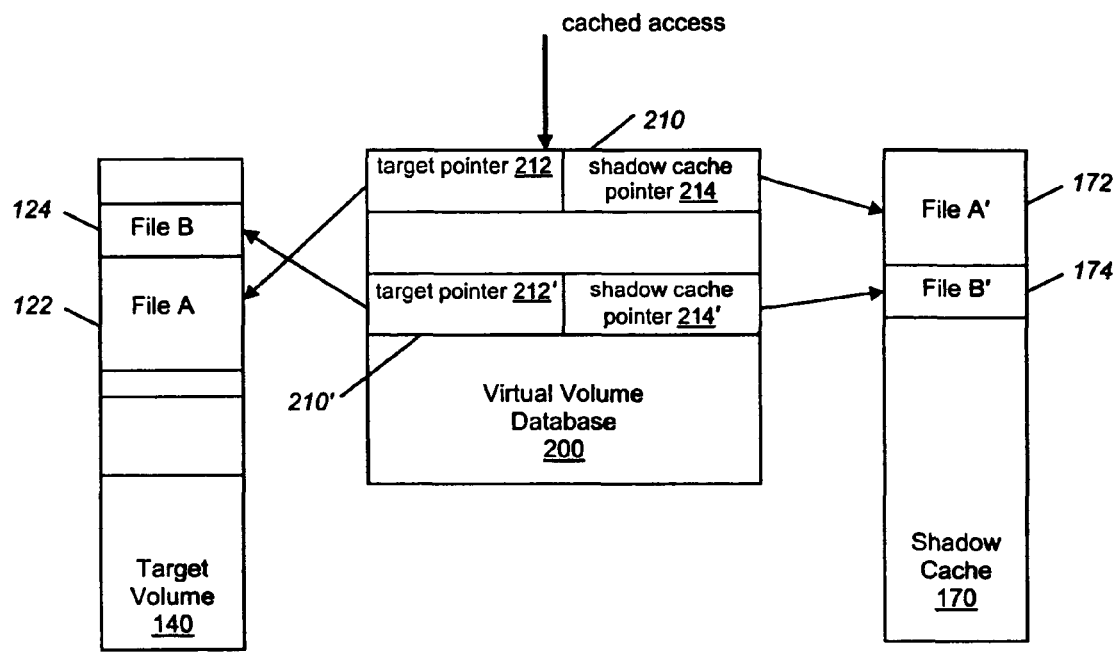
*FIG. 3*
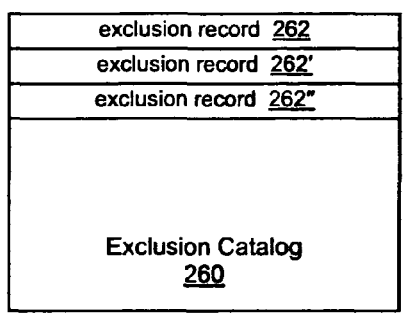
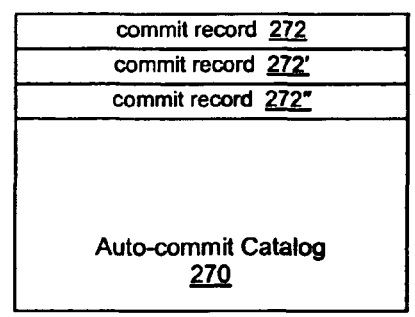
*FIG. 4*          *FIG. 5*

SYSTEMS, METHODS, AND COMPUTER READABLE MEDIA FOR COMPUTER DATA PROTECTION

BACKGROUND OF THE INVENTION

1. Field of the Invention

The present invention relates to protecting computer data.

2. Description of Related Art

Computers and computer networks face a myriad of threats to the data they contain and to their smooth and continuous operation. Due to these threats, security is a growing problem for enterprise information technology organizations, original equipment manufacturers, and home users. Computer threats in the form of viruses, worms, spyware, and the like are constantly evolving, resulting in a constant need to protect against the havoc and destruction they may cause. Large organizations cannot afford to have significant computer and network down time as a result of damage to data and software that may be caused by the threats.

Furthermore, an increased number of patches and updates to applications and operating systems (OS) are being deployed at an increasing rate, to not only improve performance and fix bugs, but to combat against these increased security risks. With these new software deployments come new problems. These new problems may disrupt the manner in which a system operates, or cause a system to become unstable, due to software incompatibilities or unsatisfactory interoperability with previously installed software.

Backup systems and methods have been proposed for dealing with viruses, and the like, as well as patches, updates, and addition of new software. These systems usually save a state of the system at regular intervals, or before the installation of software patches and new software. If and when a problem is detected, the system may be restored to the saved state. However, the restoration may take costly time and lose any system states between the saved state and the state of the system when a decision is made to return to the saved state. In addition, many of these proposals cause changes to the original operating system's file system and organization of volumes, such as hard disk drives. Various techniques propose modifying partitions on a disk, modifying the disk structure, and even modifying the master boot record of the boot volume. However, these intrusive techniques modify system parameters and operation. These changes may be difficult to undo and may actually leave the system more vulnerable to threats.

Systems and methods are needed that integrate with an original operating system's file system to enable protection of a computing system from undesired changes, and enable ways to commit those changes to the system, if and when a user, a system administrator, or other event of interest determines that the changes are appropriate.

BRIEF SUMMARY OF THE INVENTION

The present invention comprises computing systems, computer readable media, and methods of protecting the computing systems from undesired changes, and ways to commit those changes to the system upon the occurrence of an event of interest. One embodiment of the present invention includes a method of protecting data in a computing file system, comprising defining a virtual volume, mounting the virtual volume, processing at least one write access, and processing at least one virtual volume record in a virtual volume database. The virtual volume comprises the virtual volume database associated with a target volume. The at least one write access includes a write data segment and a write target pointer to the target volume, and processing the write access comprises creating a virtual volume record in the virtual volume database associated with the write access and storing the write data segment at a free location. Creating the virtual volume record includes creating a target pointer corresponding to the write target pointer and creating a shadow cache pointer corresponding to the free location of a shadow cache. Processing at least one virtual volume record occurs upon the occurrence of an event of interest and comprises copying a cache data segment from the shadow cache at a shadow cache pointer of the at least one virtual volume record to the target volume at a target pointer of the at least one virtual volume record.

Another embodiment of the present invention includes another method of protecting data in a computing file system. The method comprises defining a virtual volume, mounting the virtual volume, processing at least one write access, and processing at least one read access. The virtual volume comprises a virtual volume database associated with a target volume. The write access includes a write data segment and a write target pointer to the target volume. Processing the write access comprises creating a virtual volume record in the virtual volume database associated with the write access and storing a write data segment at a free location. Creating the virtual volume record includes creating a target pointer corresponding to the write target pointer and creating a shadow cache pointer corresponding to the free location of a shadow cache. The read access includes a read target pointer to the target volume. Processing the read access comprises comparing the read access to at least one additional virtual volume record to determine a presence of a matching virtual volume record including a matching cache pointer. Processing the read access further includes reading a target data segment from the target volume at the read target pointer if the matching virtual volume record is absent, and reading a cache data segment from the shadow cache at the matching cache pointer if the matching virtual volume record is present.

Other embodiments of the present invention include a computing system comprising a processor, a memory, a computing file system, a volume virtualizer and a mass storage device configured as a target volume. The processor may be configured for executing computer instructions and the memory may be configured for storing the computer instructions. The computing file system comprises computer instructions for execution on the processor and the system is further configured for servicing file and directory access requests from an operating system and application programs. The volume virtualizer comprises computer instructions for execution on the processor, wherein the computer instructions are configured for carrying out the previously described methods.

Still other embodiments of the present invention include a computer readable medium including a computer program, wherein the computer program comprises instructions for carrying out the previously described methods.

BRIEF DESCRIPTION OF THE DRAWINGS

In the drawings, which illustrate what is currently considered to be the best mode for carrying out the invention:

FIG. 3 is a block diagram illustrating portions of a virtual volume database, portions of a target volume, and portions of a shadow cache according to one or more embodiments of the present invention;

FIG. 4 is a block diagram illustrating portions of an exclusion catalog, in accordance with one or more embodiments of the present invention;

FIG. 5 is a block diagram illustrating portions of an auto-commit catalog, in accordance with one or more embodiments of the present invention;

DETAILED DESCRIPTION OF THE INVENTION

The present invention comprises computing systems, computer readable media, and methods of protecting the computing systems from undesired changes, and ways to commit those changes to the system, if and when a user, or other event of interest determines that the changes are appropriate.

While much of this discussion is directed toward Microsoft® operating systems such as Windows NT® and Windows XP®, the present invention is not so limited and is applicable to many operating systems. In addition, the discussion relates to managing file and directory structures on storage volumes. Generally, file movements are referred to as read accesses and write accesses. It is understood by those of ordinary skill in the art that other file accesses are possible within the scope of the invention, such as, for example, changing dates on a file, changing privileges on a file, and changing other file status indicators. Furthermore, the discussion generally refers to files. However, unless specified otherwise, references to files may include files, directories, volume sectors and other similar data structures or physical structures associated with mass storage devices. A volume may include a variety of mass storage devices, such as, by way of example and not limitation, hard disk drives, flash drives, floppy disks, digital cameras, music players, and similar devices.

Computer readable media may include, by way of example and not limitation, media and devices, such as non-volatile memories, volatile memories, hard disk drives, floppy disk drives, optical storage media, and other equivalent storage devices.

Figure 1:
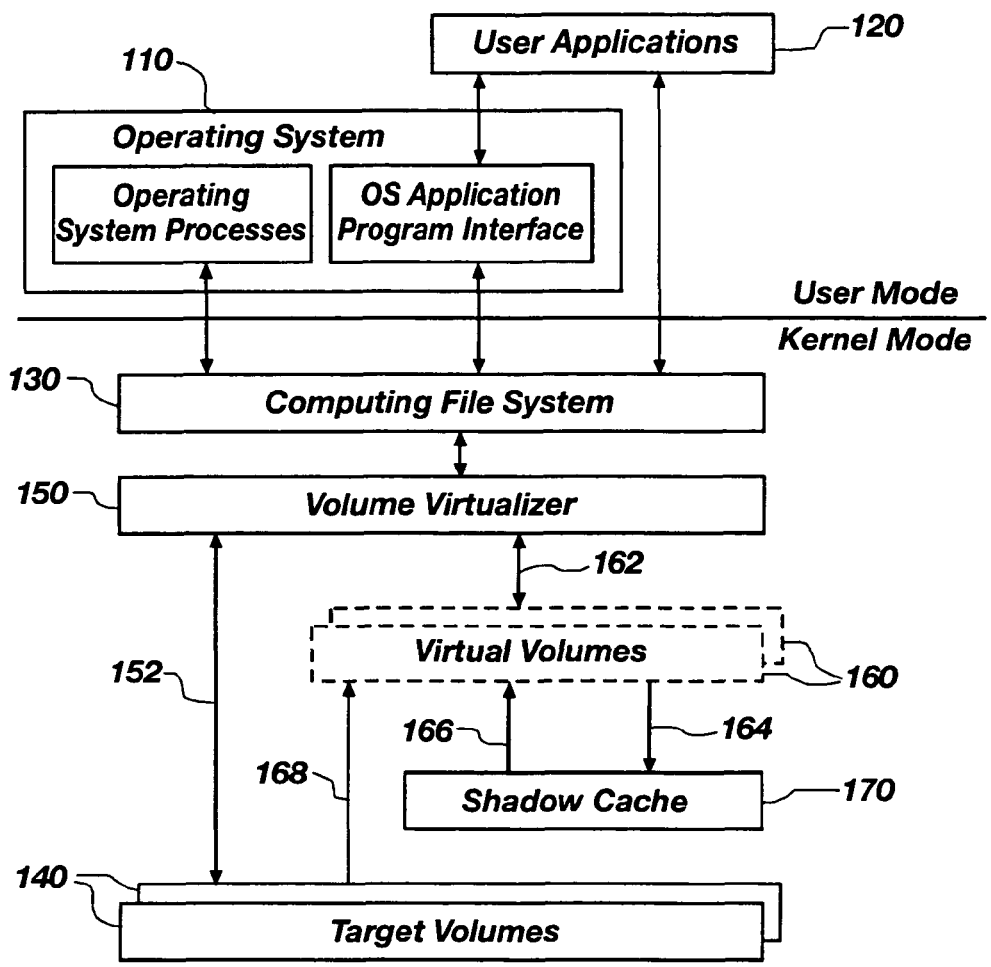
FIG. 1 is a block diagram illustrating interaction between software modules and a flow of read and write accesses in a computing system according to various embodiments of the present invention.

FIG. 1 is a block diagram illustrating interaction between software modules and a flow of read and write accesses in a computing system including the various embodiments of the present invention. Software organization of a computing system is generally divided between a user mode and a kernel mode. The user mode includes many operating system 110 (OS) functions and user applications configured for operation with the operating system 110. The kernel mode includes lower level operating system functions, such as a computing file system 130, as well as device drivers for the various hardware devices in a system. The operating system 110 and application programs 120 may make file Input/Output (I/O) requests in the form of read accesses and write accesses (also referred to as access requests) to the computing file system 130.

In systems that do not incorporate one or more of the various embodiments of the present invention, the computing file system 130 may modify such access requests as needed and pass them on directly, or through a device driver (not shown), to one or more target volumes 140. However, embodiments of the present invention include a volume virtualizer 150 configured for operation between the computing file system 130 and the target volumes 140. The volume virtualizer 150 receives access requests from the computing file system 130 and may pass them on to a target volume 140, perhaps via a hardware driver (not shown), as an access referred to as an excluded file I/O 152. In other instances, the volume virtualizer 150 may pass access requests through one or more virtual volumes 160. In processing the access requests for a virtual volume 160, write accesses may be directed to a shadow cache 170 as a cached write 164. Read accesses may be directed to the shadow cache 170 as a cached read 166 or may be directed to the target volume 140 as an un-cached read 168. The process of running the system using the volume virtualizer 150 when at least one virtual volume 160 is enabled, may be referred to as running in shadow mode, whereas running the system with the volume virtualizer 150 disabled, or with no virtual volumes 160 enabled, may be referred to as running in standard mode.

Often, changes made to a system may need to be reversed due to installation of incompatible or unwanted software. For example, in many instances, systems are a shared resource. This is the case, for example, in lab environments, training centers, public kiosks, libraries and home PCs. Unwanted software installations, folder modifications, or file modifications may place a system in an inoperable or less than optimal state. Many times, the only way to recover from this situation is to go through the time consuming process of reinstalling the operating system, applications and reconfiguring the system. Another recovery method is re-imaging the system, which can be time consuming and difficult as well.

Shadow mode may postpone or prevent unwanted software and data changes from being written to a protected volume. When in shadow mode, the unwanted changes may be written to the virtual volume, where the changes may be easily discarded before changes are committed to an actual volume.

Selecting which volumes to protect in shadow mode depends on who uses the system and how they use the system. For example, on a public access computer, it may be important to protect all volumes and not allow any permanent changes to any volumes. On the other hand, a home user may wish to protect only a system volume in shadow mode so that the system settings are protected but allowed freedom to use other volumes in standard mode where files and folders are directly committed to the target volume.

The virtual volume 160 may be a data construct, which may be mounted by the OS and appear to the OS and volume virtualizer 150 as a volume, and may not necessarily be a physical volume. When in shadow mode, access requests to a target volume 140 may be redirected to the virtual volume 160. From the virtual volume 160, the volume virtualizer 150 may direct un-cached reads 168 back to the target volume 140, whereas cached reads 166 and cached writes 164 may be directed to the shadow cache 170.

The shadow cache 170 is a storage area, which may be in free space allocated on the target volume 140, free space allocated on another mass storage device, or free space in memory. In an exemplary embodiment, the volume virtualizer 150 accepts write requests, and rather than sending them to the target volume 140, sends them to the shadow cache 170, via the virtual volume 160 for storage. Thus, the original copy of the file remains unchanged on the target volume 140, and a modified copy of the file exists in the shadow cache 170. Subsequent writes to the same file, will be directed to the same shadow cache 170 location to further modify the file. Similarly, any reads directed to files that are located in the shadow cache 170 will be directed to the shadow cache 170 to retrieve the modified file rather than the target volume 140 where the unchanged file is located. On the other hand, reads to files that have not yet been placed in the shadow cache 170 may be directed to the target volume 140 because there may be no need to place versions of a file in the shadow cache 170, when no changes have been made to the file.

Figure 2A:
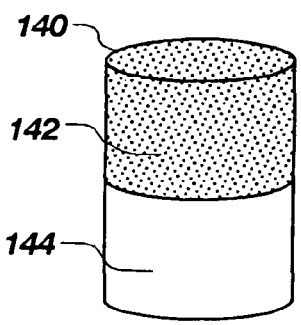
FIGS. 2A-2C depict states of a target volume at different times during practice of one or more embodiments of the present invention.
Figure 2B:
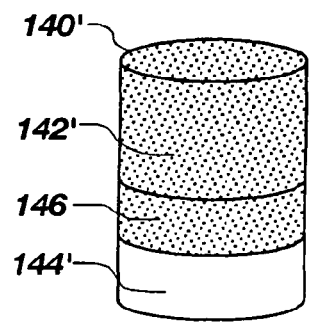
Figure 2C:
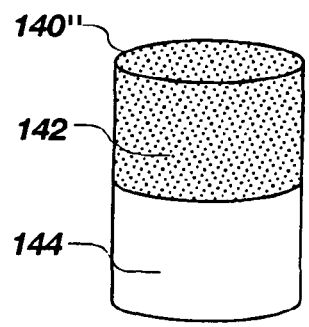

FIGS. 2A-2C depict various states of a target volume 140 at different times during practice of one or more embodiments of the present invention. FIG. 2A depicts a target volume 140 prior to running in shadow mode, showing a base configuration 142 of data stored on the volume and free space 144 on the volume. FIG. 2B illustrates the target volume 140' during shadow mode, showing (i) the base configuration 142', (ii) an area illustrating session changes 146, and (iii) a modified free space 144'. In this exemplary embodiment, the shadow cache 170 is located in the session changes 146 area such that the virtual volume comprises the base configuration 142' and the session changes 146 area. However, data written to the shadow cache 170, may not be visible to the operating system, and may be de-allocated, as if it did not exist, when returning to standard mode. FIG. 2C illustrates the volume after returning to the standard mode without making any of the session changes 146 showing the original base configuration 142" and free space 144".

FIG. 3 is a block diagram illustrating portions of a virtual volume database 200 for tracking data in a shadow cache 170, portions of a target volume 140, and portions of the shadow cache 170 according to one or more embodiments of the present invention. In some embodiments, the virtual volume database 200 may exist in system memory, however, other embodiments may locate the virtual volume database 200 on mass storage devices. The virtual volume database 200 may be used to track changes made to the virtual volume 160, by way of writes to the shadow cache 170. The virtual volume database 200 includes virtual volume records 210, which may be used to identify files that have been modified due to a write access. A virtual volume record 210 includes a target pointer 212 indicating a location on the target volume 140, where the original unmodified file is located. A virtual volume record 210 also includes a shadow cache pointer 214 indicating a location in the shadow cache 170 where the modified version of a file is located. It will be appreciated that a virtual volume record 210 may contain other various forms of data related to files, directories and their locations beyond the target pointer 212 and shadow cache pointer 214. In addition, the target pointer 212 and shadow cache pointer 214 may be complex data structures including other file information, such as, for example, data defining file size, data identifying a file as a fragmented file existing in various locations including multiple pointers, or as a linked list of pointers.

In operation, a write access may come in to a file (e.g., file A) that is previously unmodified. A virtual volume record 210 may be created in the virtual volume database 200 with the target pointer 212 stored in that virtual volume record 210. The volume virtualizer may then find a free location in the shadow cache 170, store the write data in the free location, and store a pointer to that location as a shadow cache pointer 214 in the virtual volume database 200. Subsequent read or write accesses to that same file will be compared to the target pointers (212 and 212') in the virtual volume database 200. If a matching target pointer 212 is found, the shadow cache pointer 214 associated with the matching target pointer 212 may be used to retrieve file A' from the shadow cache 170. If a new file is accessed, for example file B, a matching target pointer 212 may not be found. If the access is a write access, the volume virtualizer may allocate a new virtual volume record 210' with associated target pointer 212' and shadow cache pointer 214' as explained above. Then subsequent accesses to file B will be directed to file B' in the shadow cache 170. This process may be repeated for any reasonable number of access requests.

When a decision point is reached that the changes made in the virtual volume 160 are to be committed to the target volume 140, the virtual volume database 200 may be used to effect the changes. Each virtual volume record in the virtual volume database 200 may be retrieved to get the shadow cache pointer 214 pointing to a modified file in the shadow cache 170. The modified file is copied from the shadow cache 170 and stored on the target volume 140 at the target pointer in the virtual volume record. For example, in FIG. 3, virtual volume record 210 may be read to get shadow cache pointer 214 and target pointer 212. File A' may then be read from the shadow cache 170 and stored on the target volume 140 to overwrite file A. Subsequent virtual volume records may be processed until virtual volume record 210' is encountered. Shadow cache pointer 214' and target pointer 212' may be used to copy file B' from the shadow cache 170 and stored to the target volume 140 to overwrite file B. This process may be repeated for any other virtual volume records.

FIG. 4 is a block diagram illustrating portions of an exclusion catalog 260 including exclusion records 262. Exclusion catalogs 260 may be defined to gain the advantage of running the system in shadow mode while still allowing files and folders in the exclusion lists to be committed directly to the target volume rather than the virtual volume. Exclusion of folders makes it possible to protect volumes under shadow mode with little intrusion on the user's normal system practices. With exclusion catalogs 260, the user can protect the system files in shadow mode but still use the system and save designated folders and files in an unencumbered manner. As an example, a user may wish to exclude areas of a volume (i.e., folders on a volume) that contain data that the user wants committed to the volume, while still maintaining the shadow mode protection of system folders, which may be more vulnerable to unwanted changes.

The exclusion catalog 260 includes exclusion records 262, or may load exclusion records 262 when needed (i.e. requested by the volume virtualizer). These exclusion records 262 identify files that may be excluded from protection when a read access or write access to that file occurs. Thus, the volume virtualizer compares access requests from the computing file system to the exclusion records 262 in the exclusion catalog 260, if a matching exclusion record 262 is found, the volume virtualizer may forward the access request on to the target volume as an excluded file I/O. It will be appreciated that the exclusion record 262 may contain other various forms of data related to files, directories and their locations beyond the data used in a comparison to determine whether the access request should be forwarded to the target volume as excluded file I/O.

FIG. 5 is a block diagram illustrating portions of an auto-commit catalog 270 including commit records 272. These commit records 272 identify files that may be committed to the target volume on the occurrence of an event of interest. In some embodiments, the commit process may commit all virtual volume records in the virtual volume database as explained above. However, in other embodiments an auto-commit catalog 270 may be used to define specific files that may be committed to the target volume, while files not in the auto-commit catalog 270 may be discarded. Commit records 272 identify files that may be committed to the target volume during a commit process. In embodiments using the auto-commit catalog 270, the volume virtualizer compares access requests from the computing file system to the commit records 272 in the auto-commit catalog 270, if a matching commit record 272 is found, the volume virtualizer may perform the commit process for that file. It will be appreciated that the commit record 272 may contain other various forms of data related to files, directories and their locations beyond the data used in a comparison to determine whether the file should be committed to the target volume.

The event of interest, defining when a commit process may occur, may include a number of events. By way of example, and not limitation, the event of interest may be a scheduled event, a user request, a reboot request, a shutdown request, a virus scan event, a spyware scan event, firewall detection event, a software installation event, and other system events. Furthermore, one or more of the events of interest may be used to initiate a shadow mode session as well as begin a commit process. For example, a system, or at least one volume on the system, may be running in normal mode until the occurrence of an event of interest, which may cause the system or at least one volume in the system, to convert to shadow mode.

Exemplary embodiments may include scheduling for creating tasks to place the system into or out of shadow mode. Scheduling may be used periodically, for example, to reboot machines to ensure that available free space exists in the shadow cache. After each reboot, space that had previously been consumed by shadow mode is freed and can be used in the next shadow mode session. Furthermore, files and folders created by users that were not committed to the drive permanently may be removed, helping to ensure the privacy of the previous users as well as keeping the system configuration in an optimal state. Systems administrators who manage public use computers such as those in a lab, library, or kiosk or computers in a business setting such as a call center may optimize shadow mode use by periodically scheduling a reboot of the system. Such a reboot may clear previous user activity and ensures adequate free space for future shadow mode sessions.

Figure 6:
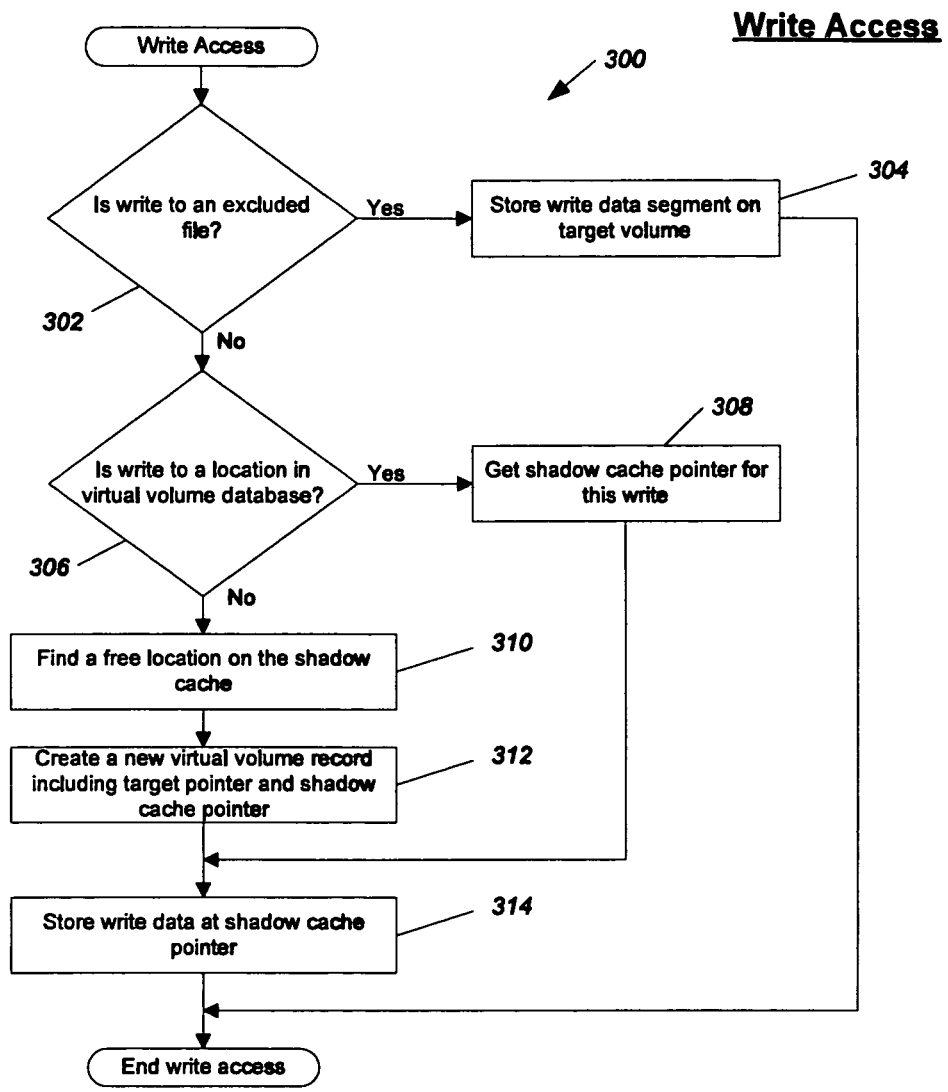
FIG. 6 is a flow diagram illustrating a write access according to one or more embodiments of the present invention.
Figure 7:
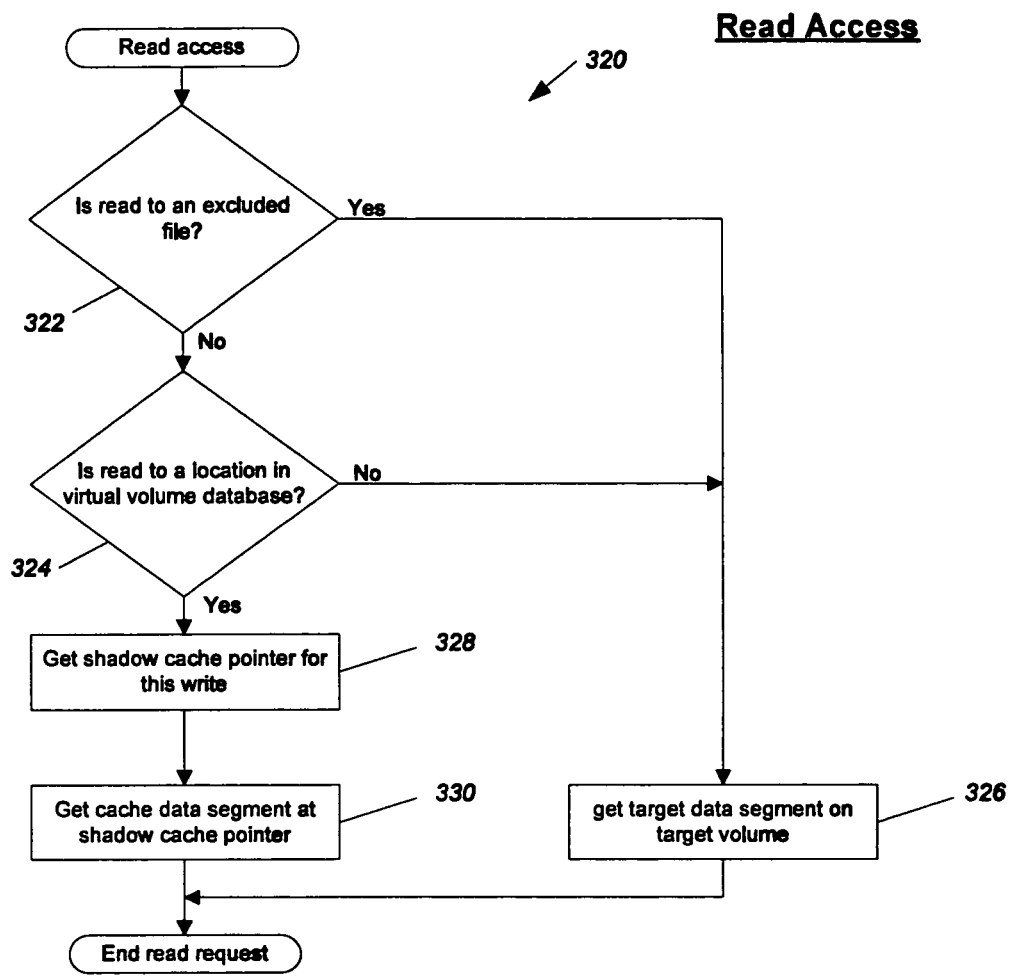
FIG. 7 is a flow diagram illustrating a read access according to one or more embodiments of the present invention.
Figure 8:
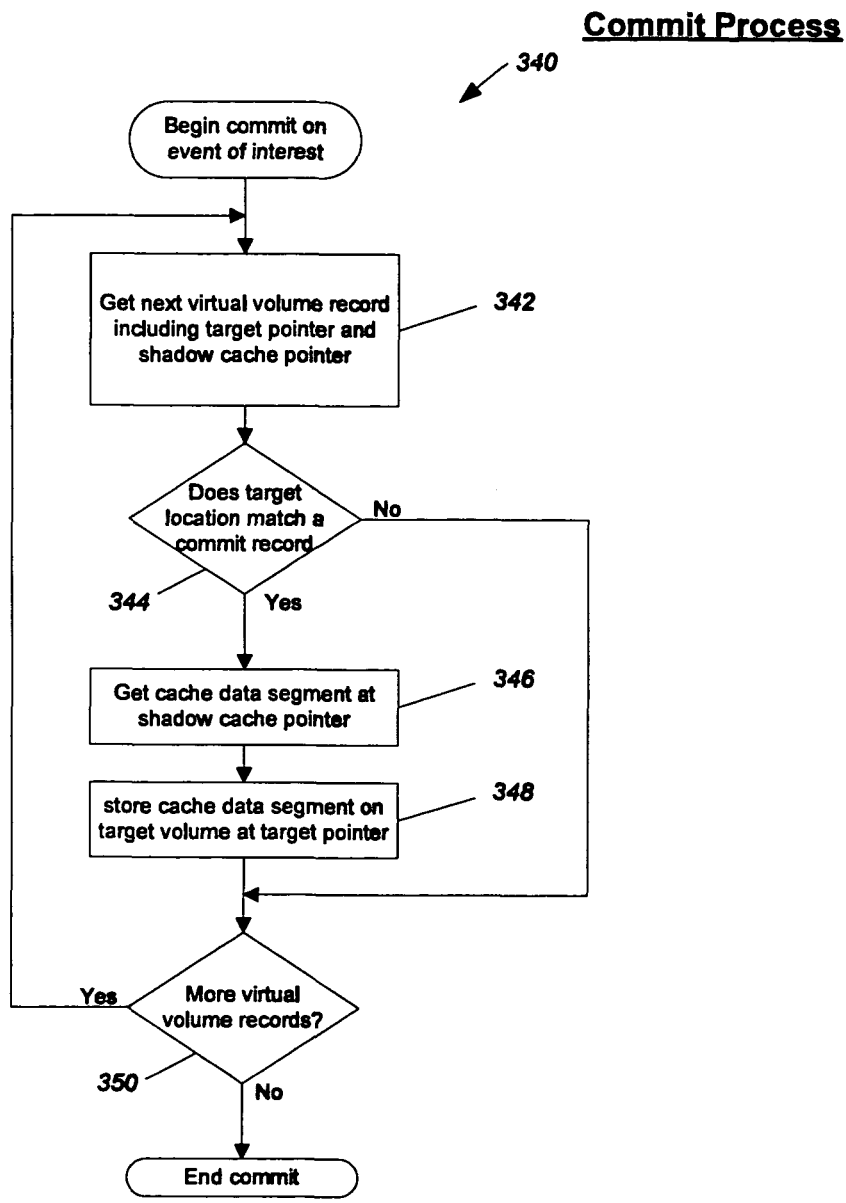
FIG. 8 is a flow diagram illustrating a commit process according to one or more embodiments of the present invention.

The following description is directed at FIGS. 6, 7, and 8 illustrating flow charts of exemplary embodiments of the present invention. The processes described in the flow charts may be implemented as software in the form of computer instructions. These computer instructions may be configured for operation in a computing system and configured for storage on a computer readable medium. It will be appreciated by those of ordinary skill in the art that many steps and processes may occur in addition to those outlined in the flow charts.

The processing of a write access 300 using the present invention is illustrated in FIG. 6. Write processing may be entered when the volume virtualizer receives a write access request from the computing file system. The write access may contain a write data segment, containing the data to be written, and a write target pointer defining where on the target volume the write data segment should be stored. Decision block 302 compares the write access to the exclusion records in the exclusion catalog to determine whether the write request is to a file covered by one of the exclusion records. If the comparison is successful then a matching exclusion record exists. If a matching exclusion record exists (i.e., decision block 302 passed), then operation block 304 stores the write data segment on the target volume at the target location and the write request is completed.

If a matching exclusion record does not exist (i.e., decision block 302 failed), then decision block 306 is performed. Decision block 306 compares the target pointer field in the virtual volume records to the write target pointer from the write request. If a match is found, then a matching virtual volume record exists. If a matching virtual volume record exists (i.e., decision block 306 passed), then operation block 308 retrieves the shadow cache pointer associated with the matching virtual volume record. The shadow cache pointer associated with a matching virtual volume record may also be referred to as a matching cache pointer. Control then transfers to operation block 314.

If a matching virtual volume record does not exist (i.e., decision block 306 failed), then operation block 310 finds a free location in the shadow cache where the write data segment can be stored. Next, operation block 312 creates a new virtual volume record, to be associated with this write data segment, in the virtual volume database. As explained earlier, the virtual volume record will contain at least a shadow cache pointer defining the free location where the write data segment is to be stored and a target pointer, which will hold the value of the write target pointer from the write request.

Operation block 314 stores the write data segment at the shadow cache pointer. The shadow cache pointer may have come from a matching virtual volume record (i.e., operation block 308) or from the allocation of a new virtual volume record (i.e., operation block 312). When the write data segment is stored in the shadow cache, the write access process 300 is complete.

The previous discussion of processing a write request includes comparing the write request to virtual volume records, and to exclusion records. However, when the virtual volume database is empty, there is no need to compare the write access to virtual volume records. In that case, the process may skip decision block 306 and operation block 308, such that the operation block 310 follows a failed decision for decision block 302. Similarly, one or more embodiments may not include an exclusion catalog. In those embodiments, the process may skip decision block 302 and operation block 304, such that processing begins with decision block 306. In addition, with no virtual volume records in the virtual volume database, and no exclusion catalog, decision blocks 302 and 306 along with operation blocks 304 and 308 may be skipped and processing may begin at operation block 310.

The processing of a read access 320 according to one or more embodiments of the present invention is illustrated on FIG. 7. Read processing is entered when the volume virtualizer receives a read access request from the computing file system. The read access may contain a read target pointer defining where on the target volume the read data segment is located. Decision block 322 compares the read access to the exclusion records in the exclusion catalog to determine whether the read access is to a file covered by one of the exclusion records. If the comparison is successful then a matching exclusion record exists. If a matching exclusion record exists (i.e., decision block 322 passed), then operation block 326 is entered, which is explained below.

If a matching exclusion record does not exist (i.e., decision block 322 failed), then decision block 324 is performed. Decision block 324 compares the target pointer field in the virtual volume records to the target pointer from the write request. If a match is found, then a matching virtual volume record exists. If a matching virtual volume record does not exist (i.e., decision block 324 failed), then operation block 326 is entered.

Operation block 326 reads data from the target volume at the read target pointer to retrieve a target data segment. The target volume is read, rather than the shadow cache, because either the file to be read is in the exclusion catalog or the file to be read has not yet been allocated to the shadow cache. When the target data segment is returned to the computing file system, the read access 320 is complete.

Returning to decision block 324, if a matching virtual volume record exists (i.e., decision block 324 passed), then operation block 328 gets the shadow cache pointer associated with the matching virtual volume record. The shadow cache pointer associated with a matching virtual volume record may also be referred to as a matching cache pointer. Next, operation block 330 reads data from the shadow cache at the matching cache pointer to retrieve a read data segment. When the read data segment is returned to the computing file system, the read access process 320 is complete.

The previous discussion of processing a read request includes comparing the read request to virtual volume records, and to exclusion records. However, when the virtual volume database is empty, there is no need to compare the read access to virtual volume records. In that case, the process may skip decision block 324 and operation blocks 328 and 330, such that operation block 326 follows a failed decision for decision block 322. Similarly, some embodiments may not include an exclusion catalog. In those embodiments, the process may skip decision block 322, such that processing begins with decision block 324. In addition, with no virtual volume records in the virtual volume database, and no exclusion catalog, decision blocks 322 and 324 along with operation blocks 328 and 330 may be skipped and processing may begin at operation block 326.

When an event of interest occurs, the present invention may restore (also referred to as a commit) some or all of the data stored in the shadow cache to the target volume. This process of committing the changes to the target volume is illustrated on FIG. 8. The commit process 340 begins when an event of interest occurs. Operation block 342 retrieves a virtual volume record from the virtual volume database. As stated earlier, the virtual volume record includes a target pointer indicating where a data segment should be stored on the target volume and a shadow cache pointer indicating where a data segment is stored in the shadow cache. Next, decision block 344 compares the target pointer to each commit record in the auto-commit catalog. If a match is not found, control steps to decision block 350, which is explained below.

If a match is found at decision block 344, operation block 346 retrieves the cache data segment pointed to by the shadow cache pointer of the current virtual volume record. Next, operation block 348 stores the cache data segment on the target volume at the location of the target pointer from the current virtual volume record. It will be recognized by those of ordinary skill in the art that a data segment may not fit in the target location, due to the data segment growing to a larger size than it was on the target volume, or may be significantly smaller leaving a hole of unused storage space. In these cases, and to manage file fragmentation on the target volume, the present invention may allocate the data segment to a new location on the target volume and report the pertinent information about this new location to the computing file system, or let the computing file system manage the data storage, as is well known to those of ordinary skill in the art.

After operation block 348, or after a failed test at decision block 344, decision block 350 tests to see if there are more virtual volume records to process. If so, control transfers back to operation block 342. If not, the commit process 340 is complete.

The previous discussion of a commit process 340 includes comparing the virtual volume records to commit records. However, some embodiments may not include an auto-commit catalog. In that case, the process may skip decision block 344, such that the operation block 346 follows operation block 342.

Figure 9:
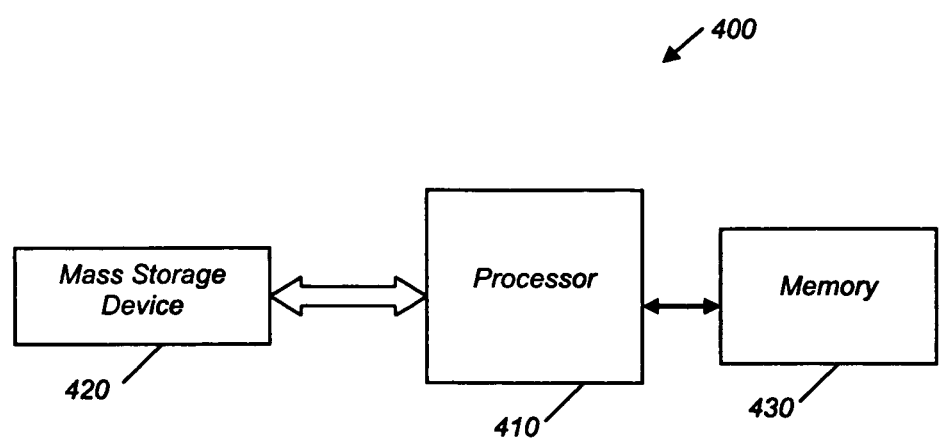
FIG. 9 illustrates a computing system according to one or more embodiments of the present invention.

As shown in FIG. 9, a computing system 400, in accordance with an embodiment of the present invention, is configured for executing the computing instructions and comprises a processor 410, a mass storage device 420, and a memory 430. The memory 430 may be used to hold the computing instructions, all or portions of the virtual volume database, all or portions of the exclusion catalog, all or portions of the auto-commit catalog, and all or portions of the shadow cache. The mass storage device 420 may be a target volume 140 as describe previously. Although this invention has been described with reference to particular embodiments, the invention is not limited to these described embodiments. Rather, the invention is limited only by the appended claims, which include within their scope all equivalent devices or methods that operate according to the principles of the invention as described.

What is claimed is:

1. A method of protecting data in a nonvolatile target volume, the method comprising:
    running an operating system (OS) file system in shadow mode in response to an occurrence of an event of interest;
    intercepting a write request sent from the OS file system and directed to the nonvolatile target volume, the write request including a data segment and a target location pointer that points to a target volume location;
    redirecting the write request to a nonvolatile shadow storage;
    writing the data segment in a shadow storage location without ever writing the data segment in the target volume location;
    creating a record in a shadow database, the record including the target location pointer and including a shadow location pointer corresponding to the shadow storage location;
    intercepting a read request sent from the OS file system and directed to the nonvolatile target volume, the read request including a second target location pointer that points to a second target volume location;
    comparing the read request to the shadow database to determine that no record having a target location pointer that matches the second target location pointer is present in the shadow database;
    reading a second data segment from the second target volume location;
    returning the second data segment to the OS file system without writing the second data segment in the shadow storage; and
    in response to switching to running the OS file system in standard mode, discarding the data segment from the shadow storage.

2. The method of claim 1, further comprising, prior to the switching to running the OS file system in standard mode:
    intercepting a third write request sent from the OS file system and directed to the nonvolatile target volume, the third write request including a third data segment and a third target location pointer that points to the target volume location;
    redirecting the third write request to a nonvolatile shadow storage;
    comparing the third write request to the record in the shadow database to determine that the target location pointer of the record matches the third target location pointer of the third write request; and writing the third data segment of the third write request in the shadow storage location.

3. The method of claim 1, further comprising, prior to the switching to running the standard OS file system in standard mode:

intercepting a third write request sent from the standard OS file system and directed to the nonvolatile target volume, the third write request including a third data segment and a third target location pointer that points to the target volume location;

comparing the third write request to an exclusion catalog to determine that an exclusion record having a target location pointer that matches the third target location pointer is present in the exclusion catalog; and storing the third data segment of the third write request in the third target volume location.

4. The method of claim 1, further comprising, prior to the switching to running the OS file system in standard mode:

intercepting a third read request sent from the OS file system and directed to the nonvolatile target volume, the third read request including a third target location pointer that points to a third target volume location;

comparing the third read request to an exclusion catalog to determine that an exclusion record having a target location pointer that matches the third target location pointer is present in the exclusion catalog; and reading a third data segment from the third target volume location.

5. The method of claim 1, wherein the event of interest is a scheduled event, a user request, a reboot request, a shutdown request, a virus scan event, a spyware scan event, a firewall detection event, a software installation event, or some combination thereof.

6. A computing system, comprising:

a processor configured for executing computer instructions;

a memory configured for storing computer instructions for execution by the processor;

the OS file system of claim 1 comprising computer instructions for execution on the processor and configured for servicing file and directory access requests from an operating system and application programs; and a volume virtualizer comprising computer instructions for execution on the processor and configured for performing the method of claim 1.

7. One or more non-transitory computer readable media including one or more computer programs, which when executed on one or more computers, cause the one or more computers to perform the method of claim 1.

8. The method of claim 1, wherein the shadow storage is located in free space of the target volume.

9. The method of claim 8, further comprising discarding the data segment stored in the shadow storage upon an event of interest.

10. The method of claim 9, wherein the event of interest is a scheduled event, a user request, a reboot request, a shutdown request, a virus scan event, a spyware scan event, a firewall detection event, a software installation event, or some combination thereof.

11. The method of claim 1, wherein the shadow storage is invisible to the OS file system such that the OS file system is unaware of the existence of the shadow storage.

\* \* \* \* \*